US005652613A

United States Patent [19]
Lazarus et al.

[11] Patent Number: 5,652,613
[45] Date of Patent: Jul. 29, 1997

[54] INTELLIGENT ELECTRONIC PROGRAM GUIDE MEMORY MANAGEMENT SYSTEM AND METHOD

[76] Inventors: David Beryl Lazarus, 7852 Spring Ave., Elkins Park, Pa. 19027; Michael Dean Ellis, 1300 Kingwood Pl., Boulder, Colo. 80304

[21] Appl. No.: 476,451

[22] Filed: Jun. 7, 1995

[51] Int. Cl.⁶ .................. H04N 5/50; H04N 7/10
[52] U.S. Cl. .................. 348/7; 348/906; 348/569; 348/460
[58] Field of Search ............... 348/906, 7, 564, 348/569, 12, 13, 6, 460; H04N 5/50, 7/10

[56] References Cited

U.S. PATENT DOCUMENTS

| | | | |
|---|---|---|---|
| 4,706,121 | 11/1987 | Young | 358/142 |
| 4,751,578 | 6/1988 | Reiter et al. | 348/906 |
| 5,038,211 | 8/1991 | Hallenbeck | 348/460 |
| 5,465,113 | 11/1995 | Gilboy | 348/906 |
| 5,532,754 | 7/1996 | Young | 348/906 |
| 5,559,548 | 9/1996 | Davis et al. | 348/6 |
| B1 4,706,121 | 12/1993 | Young | 358/142 |

FOREIGN PATENT DOCUMENTS

| | | |
|---|---|---|
| WO00670 | 1/1991 | WIPO . |
| WO14284 | 6/1994 | WIPO . |
| WO29811 | 12/1994 | WIPO . |

OTHER PUBLICATIONS

Cherricks, S. et al., "An Individually Addressable TV Receiver With Interactive Channel Guide Display, VCR, and Cable Box Control", *IEEE Transactions on Consumer Electronics*. vol. 40, No. 3, Aug. 1994, pp. 317–328.

*Primary Examiner*—Victor R. Kostak
*Attorney, Agent, or Firm*—Weil, Gotshal & Manges LLP

[57] ABSTRACT

A television electronic program guide intelligent memory management system and method automatically deletes the least valuable stored program information at that moment as free memory space is needed by the system. In advance of a program schedule update, the system executes a two-level memory "housekeeping" operation in which the system first scans the memory to identify obsolete schedule information. If, after this sweep, there is insufficient memory available for the next update, the system performs a second-level memory "triage" operation wherein schedule information is automatically prioritized in accordance with pre-defined rules for assessing the current value of the information to each viewer based on program air time, channel and other variables relating to program utility. The system then deletes schedule information in ascending order of value, starting with the least valuable information, and continues until enough space is available in memory to store the schedule update.

14 Claims, 2 Drawing Sheets

| VARIABLE NAME | VALUE | MEANING |
|---|---|---|
| time_period | 1 | 12AM-6AM |
| time_period | 2 | 6AM-7PM;10PM-12AM |
| time_period | 3 | 7PM-10PM |
| channel_value | 1 | normal |
| channel_value | 2 | favorite |
| channel_value | 2 | purchased |
| channel_value | 4 | purchased & favorite |
| hours_away | 16 | 0-6 hours |
| hours_away | 8 | 6-12 hours |
| hours_away | 4 | 12-18 hours |
| hours_away | 2 | 18-24 hours |
| hours_away | 1 | > 24 hours |

FIG.2

INTELLIGENT ELECTRONIC PROGRAM GUIDE MEMORY MANAGEMENT SYSTEM AND METHOD

FIELD OF INVENTION

The present invention relates to a memory management system and method, and, in particular, to an intelligent system and method for allocating the finite memory resources of a television electronic program guide ("EPG") according to the current utility of the program schedule information stored in the EPG's memory.

BACKGROUND OF INVENTION

There are known EPG systems which provide television viewers with on-screen program schedule information in a convenient format. In so-called interactive EPGs, the operation of the EPG is under user control so that the user may browse schedule information in any order, select programs from on-screen menus for current or future viewing, order pay-per-view programming and perform other useful operations on demand. An example of an advanced EPG system is described in co-pending application serial no. 08/119367 by Bennington, et al., entitled "Electronic Television Program Guide Schedule System and Method" (hereinafter, "Bennington et at."), incorporated herein by reference.

Most EPGs operate in the following basic manner: program schedule information, and sometimes applications and/or systems software, is transmitted to equipment located on the viewer's premises (usually a "set-top box") by way of broadcast, cable, direct satellite or some other suitable form of transmission. The set-top box contains memory so that the program schedule information can be retained for later viewing. The program schedule information stored in the set-top box is periodically updated (e.g., on a continuous, daily, weekly, bi-weekly basis). A programmed microcontroller in the set-top box cooperates with the viewer's television set to display the stored program schedule information and to implement other functions of the EPG in response to user-generated signals. The functions available will depend on the sophistication of the particular EPG.

In all such EPGs in which schedule information is stored in memory in customer premises equipment, memory storage capacity is a major concern. The size of the memory will govern the volume of programming information available for the viewer's inspection at any one time and thus directly effect the perceived value of the EPG to viewers. Cost and physical size considerations place practical limits on the storage capacity of the set-top box. Therefore, there must be some mechanism for managing this finite resource so as to maximize the perceived value of the EPG to the user.

In this regard, simply deleting program information as it becomes outdated to make room for the new program schedule information for every available channel in the viewer's service area, as in some EPGs proposed, is less than optimal in terms of maximizing value to the viewer. The most valuable programming information to a given viewer will not, in general, correspond to the complete schedule for all available channels for the time period covered by the information. For instance, schedule information for a premium channel that the viewer doesn't subscribe to will be of lesser interest to the viewer than, say, the schedule information for the "major" channels (e.g., ABC, CBS, NBC, CNN). If the EPG permits the viewer to load one or more "favorite channels" into the EPG, the viewer will obviously be more interested in the schedules for those channels than others.

Accordingly, there is a need for an intelligent EPG memory management system which takes into account the differing utility of the various types of program information stored in the EPG so as to maximize the value of the EPG to the viewer. One proposed solution to this need is discussed in U.S. Pat. No. 5,038,211 to Hallenbeck (hereinafter, "Hallenbeck"). In the EPG system of Hallenbeck, schedule information is transmitted to the viewer in three separate transmissions, the first of which is used by a user-configured information pre-filter in the EPG to determine whether the information in the subsequent transmissions should be stored or discarded.

This selective reception approach to EPG memory management has at least two drawbacks, however. First, the transmission of schedule information must be carried out using special protocols, which introduces complexity on the service provider's side of the EPG. A second drawback is the pre-filter's inability to ascribe intermediate values of utility to program schedule information. By making an initial binary determination as to utility (valuable—store; not valuable—reject), the EPG of Hallenbeck may prevent potentially useful information from reaching the viewer. Moreover, the pre-filtering scheme of Hallenbeck does not take into account the fact that the value of program information will in general vary over time, making a priori determinations about the future utility of information inappropriate in certain situations. In other words, to the extent the EPG of Hallenbeck makes a projection as to the future value of program information sent to the viewer when it is received, its pre-filtering scheme is likely to be overinclusive as to the information rejected.

It is therefore one object of the present invention to provide an EPG memory management system that does not require special transmission protocols. It is a further object of the present invention to implement an EPG which initially stores the schedule information for the viewer's service area and which then permits the program information to assume a continuous range of values according to its present utility so that the least valuable information stored in memory can be identified and deleted on a real-time basis as free memory space is needed by the system.

BRIEF SUMMARY OF INVENTION

These and other objects are accomplished in accordance with the present invention by a memory management system and method in which program schedule information is sent to viewers in a single transmission. The program schedule for the corresponding time period is initially stored in the EPG memory and is thus available for the viewer's perusal. In advance of the next schedule update, the system of the present invention executes a two-level memory "housekeeping" operation to make room in memory for the information in the update. First, the system performs a high-level scan of the memory to identify obsolete schedule information (expired programming). If, after this sweep, there is insufficient memory available for the next update, the system performs a second-level memory "triage" operation wherein schedule information is prioritized in accordance with predefined rules for assessing the current value of the information to each viewer. The system then deletes schedule information in ascending order of value, starting with the least valuable information, and continues until enough space is available in memory to store the schedule update.

BRIEF DESCRIPTION OF THE DRAWINGS

FIG. 2 is a table of variables and corresponding numerical values used to quantify the current value of the schedule information held in the EPG's memory.

DETAILED DESCRIPTION OF A PREFERRED EMBODIMENT

Figure 1:
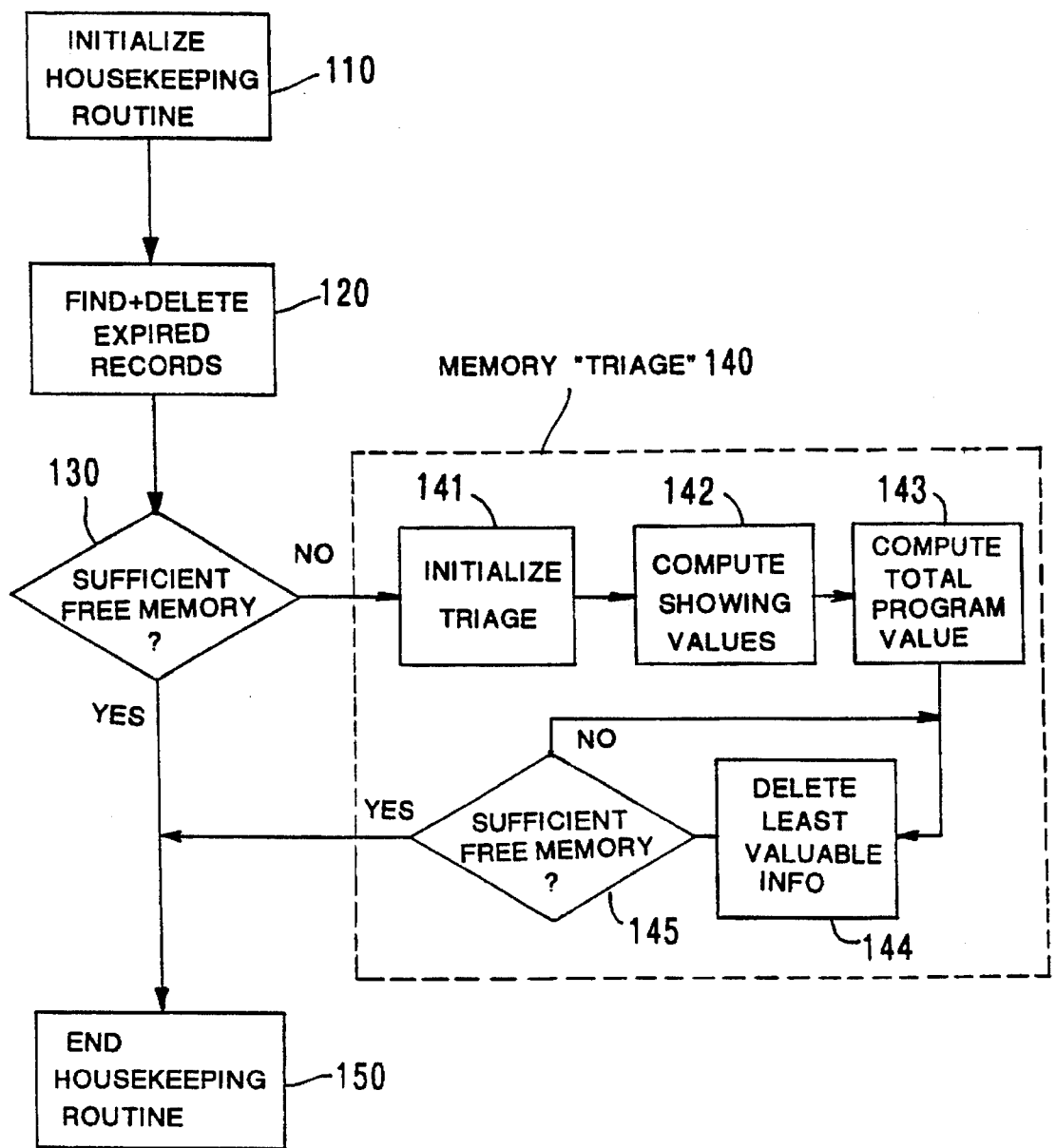
FIG. 1 is an overview of the memory management operations implemented by the present invention.

The system and method of the present invention may be implemented on any suitable EPG platform having storage means for storing program schedule information, programmed processor means for executing a memory management software program in accordance with the invention's various memory management functions, and a clock for keeping track of the current date and time. The program of the present invention may be stored in a separate storage means or in a separate portion of the same storage means used for the schedule information. The coding of a program to carry out the procedures of the present invention will be readily apparent to the ordinarily-skilled programmer.

A suitable platform for implementing the present invention is the EPG of Bennington, et al., mentioned above. Referring to FIG. 1 of Bennington, et al., the program of the present invention is loaded into and stored in non-volatile memory EEPROM 20. Schedule information in this platform is stored in a database constructed in DRAM 18. As explained in Bennington, et al., no special transmission protocols are required to send and receive program schedule information. Thus, program schedule information for the viewer's service area for the corresponding time period may be sent to the viewer's set-top box in a single data stream transmission and loaded into the database. The specific data items held in the schedule database will be discussed below in connection with the memory management routines that they support. The construction and organization of the program schedule database are routine tasks, as the ordinarily-skilled artisan will appreciate. Microcontroller 16 provides a suitable processor means for executing the program of the present invention, and the clock 19 keeps track of the current time and date (for comparing against schedule records). Other suitable hardware configurations will occur to those skilled in the art to which the present invention pertains. The present invention is not directed to the particular details of the reception and display means of the EPG, and, to avoid obscuring the present invention, the operation of such elements will not be discussed here.

It is useful to begin with an overview of the invention, presenting FIG. 1 in a flowchart format. The primary function of the present invention is to create free space in the memory used for schedule information storage. This is accomplished by what will be referred to as a database "housekeeping" routine 100. The housekeeping routine may be invoked as often as necessary to free up space in the memory. In some preferred embodiments of the invention, the housekeeping function is performed at least in advance of every program schedule information update. The housekeeping routine may be invoked more or less frequently depending on the EPG's particular requirements. For example, in some preferred embodiments of the present invention, a complete new schedule is sent to subscribers on a daily, weekly, or some other periodic basis, with no data sent in between complete schedule updates. In these embodiments, the housekeeping routine need only be run in advance of the next schedule. In other preferred embodiments, the system does not wait until a complete new schedule is ready to be transmitted before updating the EPG. Rather, incremental updates to the program schedule are continuously sent to subscribers. In this "cyclical" mode of operation, when all of the data in a schedule has been sent, transmission of schedule data updates immediately begins. Each subsequent transmission includes updates to schedule information already stored in the EPG as well as new data for the end of the covered time period. Any schedule data that has expired since the last transmission is not sent. Because new records are constantly received by the EPG, the housekeeping routine must be invoked more frequently that in embodiments in which complete new program schedules are sent on a daily or other periodic basis.

Once the housekeeping routine is initialized 110, the system begins a search of the schedule database for expired records. To do this, the find and delete subroutine 120 scans each program record to identify program records whose time and date data indicate that the record is expired. All such records are tagged and deleted from the program schedule database. Next, the system determines whether sufficient memory space is available to store the incoming schedule information. In this subroutine 130, the system compares the available memory space with a predetermined memory utilization value, above which the system deems the available free memory space insufficient. If there is insufficient free space memory available, the system then invokes the triage subroutine 140 wherein, as explained more fully below, information contained in unexpired program records is prioritized and deleted according to its current value to the viewer. The triage routine 140 stops after enough information has been deleted to accommodate the new schedule information to be stored. At this point, the housekeeping routine terminates 150, ready to be invoked again as needed.

The detailed steps involved in each of the subroutines just discussed will now be explained. In this illustrative embodiment of the present invention, a program schedule record includes a calendar_date, program start_time and duration field for each scheduled showing of the program. For program showings which start on one day and end on another, the calendar_date field is set to the date on which the program ends. Where the calendar_date field for a showing is greater than the current date, the find and delete routine 120 retains the data associated with the showing, as the record corresponds to future programming. Where the calendar_date field is less than the current date, the program record corresponds to expired programming and the data associated with the showing is therefore deleted. If the calendar_date is equal to the current date, the system adds the program start_time and duration fields together and compares the sum to the current time. Data for each showing are then deleted or retained depending on the outcome of the comparison. The find and delete routine 120 proceeds in this manner until the entire program schedule database has been scanned and purged of expired records. Where all of the showings of a particular program are expired, the system deletes the entire record corresponding to that program (which, as will be discussed later, contains other information about the program). If the EPG system permits time-sensitive messages to be stored, these too can be deleted in the manner just described. In general, any information stored in the EPG that may become obsolete by virtue of the passage of time can be scanned and deleted in accordance with the present invention.

After the system makes the first pass through the program schedule database, it next determines whether sufficient memory space has been freed-up to accommodate the incoming data. The comparison routine 130 does this by retrieving a previously stored memory utilization parameter that can be set to any value according to the particular system requirement. In a preferred embodiment, the utilization parameter is chosen to be at least as large as the space in memory occupied by the maximum amount of information that can be sent in a program schedule update. In this way, the EPG can receive a complete program schedule for the corresponding time period. The memory utilization parameter may, of course, be set to any arbitrary value based on the requirements of the particular EPG system. Where, for instance, the EPG accepts smaller amounts of data (i.e., smaller than an entire program schedule), the memory utilization parameter could be set to a lower value than where the EPG must accommodate a full program schedule in an update. In the preferred embodiment described above in which incremental updates are continuously sent to subscribers, the system would set the memory utilization parameter according to the number of hours of new program schedule data it wishes to support in the next schedule update. If the system determines that there is sufficient free memory, then the housekeeping routine 100 terminates. If, on the other hand, the deletion of expired records fails to free up enough memory space as determined by the predetermined utilization parameter, then the triage routine 140 must be invoked.

The triage routine 140 of the present invention performs an information prioritization function, quantifying the current value of the information associated with each program record so that the least valuable information can be tagged and deleted on a real-time basis. The program schedule records in this illustrative embodiment of the present invention include, in addition to data identifying the program name, the program air time(s) and channel(s) carrying the program, data corresponding to a program's full title ("Long Title") and a summary description of the program's content ("Information Record"), both of which need only be stored once for a given program. Other informational records may also be stored as part of the program records. For purposes of illustration, however, only the Long Title and Information Record will be considered. It should be understood that any type of data associated with a program in the schedule can be evaluated and prioritized in accordance with the present invention.

The Long Title and Information Records associated with each program, while helpful, are not necessary to identify a program and its corresponding air times and, moreover, tend to occupy a good deal of the system's memory. The object of the triage routine in this exemplary embodiment is therefore to identify the least valuable Long Title and Information Records in the database so that this data may be deleted. In this way, space is made available in memory while at the same time retaining the core schedule information (program short title, air time(s) and channel(s)) for each program in the schedule. Of course, it will be immediately recognized that any type of information stored in the EPG's memory may be valued in accordance with the techniques of the present invention.

After the triage routine is initialized 141, the system first visits each scheduled showing of a program and assigns a value to each of three program variables associated with the showing. The variable names and their corresponding values are displayed in the table at FIG. 2. As shown in this table, the higher values are assigned to time periods, channels and air times more likely to interest the viewer. As can also be seen in the table of FIG. 2, the EPG of the preferred embodiment permits the viewer to designate favorite channels and keeps a record of these channels along with the premium channels that the viewer has purchased. The "normal" channels are those not designated purchased or favorite, and, accordingly, have lower values attached to them. The list of variables shown in FIG. 2 is illustrative only, and it will be readily understood that other variables may be used to quantify the current usefulness of program information, the number of such variables limited only by the capacity of the particular EPG system to which the present invention is applied. Likewise, the specific values chosen for each the variable ranges in the preferred embodiment are exemplary only, and may be in general be varied according to local demographics or other parameters.

The system next computes a value for each showing of a program 142 according to the following equation:

$$\text{schedule\_record\_value} = \text{channel\_value} * \text{time\_period} * \text{hours\_away} \qquad (1)$$

Other variables may be multiplicatively added to the above equation (1), such as a "selected_program" variable equal to a high value (e.g., 8) when the viewer has set a reminder to watch that program or has purchased that specific program, and equal to unity for all other programs. A "scope" variable corresponding to the value of a data tag attached the program record and indicative of the degree to which the program is "local" in nature may also be included in equation (1). Higher scope values would be assigned to data with a more local orientation, reflecting its higher level of interest to the viewer. Once the schedule_record_value for every showing of a program has been computed, the system adds all of the schedule_record_values for a given program together to arrive at a total value for that program's data ("total_program_value") 143. This unique aspect of the present invention allows the EPG to ascribe a continuous range of values of utility to program information, thereby transforming an otherwise subjective judgment ("what is the 'value' of a program?") into an objective one, suited to automatic execution. Alternatively, the system could be programmed to use the highest schedule_record_value for a program as that program's value. This embodiment might be useful in instances where it is determined that viewers are more interested in programs with very high individual schedule_record_values (e.g., a program with its last scheduled showing in two hours) than in programs with lower individual schedule_record_values but high aggregated program values.

After the total_program_value for every program stored in memory has been computed, the system is ready to make a determination as to the least valuable Long Title and Information Records in memory. In one embodiment, the least valuable Information Record and Long Title are simply those associated with the program having the lowest total_program_value as computed above. In that case, the system would tag the corresponding Long Title and Information Record and delete their data from memory 144. Deletion of data would proceed in this manner, beginning with the next least valuable program, until enough free space has been created (determined in routine 145, as in the find and delete routine 120, by the pre-defined memory utilization parameter). Alternatively, the system could be configured to weight the Information Record and Long Title data differently. In this embodiment of the present invention, Record_Values would be computed for each of the two types of data in accordance with the equation:

$$\text{Record\_Value} = \text{total\_program\_value} * \text{record\_type}, \qquad (2)$$

where record_type is a unique value assigned by the system to the type of data (Information Record or Long Title) associated with the program. Deletion of data would then be carried out starting with the lowest Record_Value data, whether that be an Information Record or Long Title, and continuing until sufficient free space in memory is available. In this embodiment, equation (1) and equation (2) could be combined into a single equation for ease of execution. Whichever embodiment is being used, the least valuable data is deleted until compliance with the pre-determined utilization parameter is achieved in step 145. In instances where two program records have identical values, the system deletes the largest record as measured in total number of bytes.

Thus, it can be seen that the present invention allows the EPG to manage its memory resources in a more flexible and efficient manner in comparison to prior art systems. No special transmission protocols are required. And, rather than fixing a binary value to program data and rejecting it on that basis before it is stored, the present invention stores the program data in a given schedule update as it is received and permits the value of the data to vary over a continuous range of values during its residency in memory. The viewer gains the two-fold benefit of having all potentially valuable program information available at the outset, while at the same time having the least valuable information stored in the EPG identified and deleted on a real-time basis as memory space is needed.

It will be appreciated that although the present invention has been described by reference to particular embodiments, many other embodiments may be implemented without departing from the spirit and scope of the invention as set forth in the following claims.

What is claimed is:

1. In a television electronic program guide (EPG) system, including means for receiving program schedule information including program names, scheduled air times and channels, means for storing the program schedule information, means for executing an EPG program and display means for displaying schedule information on-screen, a memory management system comprising:
    a) means for storing the program schedule information associated with programs to be shown in a corresponding time period;
    b) means for automatically deleting expired program schedule information from the storage means to create free space to accommodate storage of new program schedule information; and
    c) means for automatically deleting, as needed to create additional free space in the storage means for storage of new program schedule information, unexpired program schedule information according to its current utility to a viewer.

2. A memory management system according to claim 1 further comprising means for specifying the amount of free space in storage means needed.

3. A memory management system according to claim 2 further comprising means for comparing actual free space in the storage means with the needed amount.

4. The memory management system according to claim 3 wherein the means for deleting expired program schedule information is activated when the comparison means indicates actual free space in the storage means is less than the needed amount and deactivated when the comparison means indicates free space in the storage means is greater than or equal to the amount needed.

5. The memory management system according to claim 4 wherein the means for deleting unexpired program schedule information is activated when the storage means contains no expired program schedule information and the comparison means indicates actual free space in the storage means is still less than the amount needed and deactivated when the comparison means indicates free space in the storage means is greater than or equal to the amount needed.

6. The memory management system according to claim 5 wherein the means for deleting unexpired program schedule information includes means for assigning a utility value to each program for which corresponding program schedule information is stored in the storage means and means for deleting program schedule information in decreasing order of utility of the program corresponding to such information.

7. The memory management system according to claim 6 wherein the means for assigning utility values to programs includes means for computing a value for each scheduled showing of a program according to utility criteria including channel, showing time and hours away, and means for aggregating such values to compute a total value for each program.

8. In a television electronic program guide (EPG) system, including means for receiving program schedule information including program names, scheduled air times and channels, means for storing the program schedule information, means for executing an EPG program and display means for displaying schedule information on-screen, a method for managing EPG memory comprising the steps of:
    a) storing the program schedule information associated with programs to be shown in a corresponding time period;
    b) automatically deleting expired program schedule information from the storage means to create free space to accommodate storage of new program schedule information; and
    c) automatically deleting, as needed to create additional free space in the storage means for storage of new program schedule information, unexpired program schedule information according to its current utility to a viewer.

9. The memory management method according to claim 8 further comprising the step of specifying the amount of free space in the storage means needed.

10. The memory management method according to claim 9 further comprising the step of comparing actual free space in the storage means with the needed amount.

11. The memory management method according to claim 10 wherein the step of deleting expired program schedule information is carried out when the comparison step indicates actual free management in the storage means is less than the needed amount and concluded when the comparison means indicates free space in the storage means is greater than or equal to the amount needed.

12. The memory management method according to claim 11 wherein the step of deleting unexpired program schedule information is carried out if the comparison step indicates actual free space in the storage means is less than the amount needed and there is no expired program schedule information in the storage means and concluded when the comparison means indicates free space in the storage means is greater than or equal to the amount needed.

13. The memory management method according to claim 12 wherein the step of deleting unexpired program schedule information includes the step of assigning a utility value to each program for which corresponding program schedule information is stored in the storage means and the step of deleting program schedule information in decreasing order of utility of the program corresponding to such information.

14. The memory management method according to claim 13 wherein the step of assigning utility values to programs includes the step of computing a value for each scheduled showing of a program according to utility criteria including channel, showing time and hours away, and the step of aggregating such values to compute a total value for each program.

* * * * *